US010972860B2

(12) United States Patent
Bastide et al.

(10) Patent No.: US 10,972,860 B2
(45) Date of Patent: Apr. 6, 2021

(54) RESPONDING TO CHANGES IN SOCIAL TRAFFIC IN A GEOFENCED AREA

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 15/604,996

(22) Filed: May 25, 2017

(65) Prior Publication Data

US 2018/0343538 A1 Nov. 29, 2018

(51) Int. Cl.
*H04W 4/021* (2018.01)
*H04L 29/08* (2006.01)
(Continued)

(52) U.S. Cl.
CPC ............ *H04W 4/021* (2013.01); *H04L 63/00* (2013.01); *H04L 67/18* (2013.01); *H04L 67/26* (2013.01);
(Continued)

(58) Field of Classification Search
CPC ....... H04W 4/021; H04L 67/26; H04L 67/306
See application file for complete search history.

(56) References Cited

U.S. PATENT DOCUMENTS 5,359,660 A * 10/1994 Clark ...................... H04L 29/06
713/167
7,558,404 B2 7/2009 Ma et al.
(Continued)

FOREIGN PATENT DOCUMENTS

| CN | 102930248 A | 2/2013 |
| CN | 103413321 A | 11/2013 |

(Continued)

OTHER PUBLICATIONS

"What is geo-fencing (geofencing)?—Definition from WhatIs.com" May 6, 2016, archived from archive.org, available at https://web.archive.org/web/20160506002537/http://whatis.techtarget.com:80/definition/geofencing (Year: 2016).*

*Primary Examiner* — German Viana Di Prisco
(74) *Attorney, Agent, or Firm* — L. Jeffrey Kelly; Edell, Shapiro & Finnan, LLC (57) ABSTRACT

A system and method for responding to changes in social traffic in a geographic area receives, via an electronic communications interface, information describing a geographic area and one or more attributes of people expected to be in the geographic area. A geofence is defined based on the information describing the geographic area, and a cohort of people expected to be in the geofence is defined based on the one or more attributes. Information from a sensor regarding an attribute of a person at a geographic location is received via an electronic communications network. Based on the attribute, a determination is made whether or not the person is a member of the cohort of people expected to be in the geofence. An alert may be triggered based at least in part on whether or not the person is a member of the cohort of people expected to be in the geofence.

25 Claims, 4 Drawing Sheets

(51) Int. Cl.
*H04L 29/06* (2006.01)
*H04W 12/00* (2021.01)
(52) U.S. Cl.
CPC ..... *H04L 67/306* (2013.01); *H04W 12/00503* (2019.01)

(56) References Cited

U.S. PATENT DOCUMENTS

| | | | | |
|---|---|---|---|---|
| 8,467,770 | B1* | 6/2013 | Ben Ayed | H04L 63/107 |
| | | | | 455/411 |
| 2010/0205667 | A1* | 8/2010 | Anderson | G06F 3/013 |
| | | | | 726/19 |
| 2012/0008526 | A1* | 1/2012 | Borghei | H04W 4/021 |
| | | | | 370/254 |
| 2012/0150966 | A1* | 6/2012 | Fan | G06Q 10/107 |
| | | | | 709/206 |
| 2016/0261424 | A1* | 9/2016 | Gamberini | H04L 12/2803 |
| 2016/0283799 | A1 | 9/2016 | Carey | |
| 2017/0230792 | A1* | 8/2017 | Shaik | G06F 3/04847 |
| 2017/0374511 | A1* | 12/2017 | Buchmann | G06Q 50/28 |
| 2019/0364389 | A1* | 11/2019 | Hernoud | H04L 41/06 |

FOREIGN PATENT DOCUMENTS

| | | |
|---|---|---|
| CN | 103745230 A | 4/2014 |
| CN | 102799863 B | 12/2014 |

\* cited by examiner

RESPONDING TO CHANGES IN SOCIAL TRAFFIC IN A GEOFENCED AREA

BACKGROUND

Present invention embodiments relate to computer systems and methods for determining changes in social traffic in a geographic area and, more particularly, computer systems and methods for responding to such changes.

In large and complex organizations, people may not always be aware that visitors are present in their area. However, it is important that people in the organization act appropriately when visitors are present. For example, people in the organization should be careful not to accidentally disclose any confidential data to the visitors.

Additionally, people in large and complex organizations are frequently unaware of off-site events attended by their colleagues.

Currently, people rely on communications from other employees to be notified about such situations. However, such communications may be sent weeks in advance and forgotten by the time the event occurs. Thus, there remains a need to address such situations.

SUMMARY

According to an example embodiment of the present invention, a computer-implemented method for responding to changes in social traffic in a geographic area is provided. The method comprises receiving, via an electronic communications interface, information describing a geographic area and one or more attributes of people expected to be in the geographic area. A geofence is defined based on the information describing the geographic area, and a cohort of people expected to be in the geofence is defined based on the one or more attributes. Information from a sensor regarding at least one attribute of a person at a geographic location is received via an electronic communications interface, and a determination is made, based on the at least one attribute, whether or not the person is a member of the cohort of people expected to be in the geofence. In one embodiment, if the person is inside the geofence and determined to not be a member of the cohort of people expected to be in the geofence, an alert is triggered. The alert may cause a warning to be sent to members of the cohort, a lock-screen command to be sent to client computers in the geofence, and/or an advertisement or message to be displayed for the visitors. In another embodiment, if the person is outside the geofence and determined to be a member of the cohort, an alert may be triggered. For example, information about an event occurring at the geographic location of the person may be collected, via an electronic communications interface, and triggering an alert may include sending, via an electronic communications interface, a message about the event to one or more members of the cohort expected to be in the geofence. Accordingly, the cohort of people may be kept apprised of changes in social traffic and appropriate actions may be taken in a timely manner.

According to another example embodiment of the present invention, a system for determining changes in social traffic in a geographic area is provided. The system comprises at least one processor configured to receive, via an electronic communications interface, information describing a geographic area and one or more attributes of people expected to be in the geographic area. A geofence is defined based on the information describing the geographic area, and a cohort of people expected to be in the geofence is defined based on the one or more attributes. Information from a sensor regarding at least one attribute of a person at a geographic location is received via an electronic communications interface, and a determination is made, based on the at least one attribute, whether or not the person is a member of the cohort of people expected to be in the geofence. In one embodiment, if the person is inside the geofence and determined to not be a member of the cohort of people expected to be in the geofence, an alert is triggered. The alert may cause a warning to be sent to members of the cohort, a lock-screen command to be sent to client computers in the geofence, and/or an advertisement or message to be displayed for the visitors. In another embodiment, if the person is outside the geofence and determined to be a member of the cohort, an alert may be triggered. For example, information about an event occurring at the geographic location of the person may be collected, via an electronic communications interface, and triggering an alert may include sending, via an electronic communications interface, a message about the event to one or more members of the cohort expected to be in the geofence. Accordingly, the cohort of people may be kept apprised of changes in social traffic and appropriate actions may be taken in a timely manner.

According to yet another example embodiment of the present invention, a computer program product for determining changes in social traffic in a geographic area is provided. The computer program product comprises a computer readable storage medium having program instructions embodied therewith. The program instructions are executable by a computer processor to cause the computer processor to receive, via an electronic communications interface, information describing a geographic area and one or more attributes of people expected to be in the geographic area. A geofence is defined based on the information describing the geographic area, and a cohort of people expected to be in the geofence is defined based on the one or more attributes. Information from a sensor regarding at least one attribute of a person at a geographic location is received via an electronic communications interface, and a determination is made, based on the at least one attribute, whether or not the person is a member of the cohort of people expected to be in the geofence. In one embodiment, if the person is inside the geofence and determined to not be a member of the cohort of people expected to be in the geofence, an alert is triggered. The alert may cause a warning to be sent to members of the cohort, a lock-screen command to be sent to client computers in the geofence, and/or an advertisement or message to be displayed for the visitors. In another embodiment, if the person is outside the geofence and determined to be a member of the cohort, an alert may be triggered. For example, information about an event occurring at the geographic location of the person may be collected, via an electronic communications interface, and triggering an alert may include sending, via an electronic communications interface, a message about the event to one or more members of the cohort expected to be in the geofence. Accordingly, the cohort of people may be kept apprised of changes in social traffic and appropriate actions may be taken in a timely manner.

BRIEF DESCRIPTION OF THE DRAWINGS

Generally, like reference numerals in the various figures are utilized to designate like components.

DETAILED DESCRIPTION

Present invention embodiments establish a likely geofence for a given cohort of people, monitor social traffic (e.g., movement of people into and out of the geofence), and alert members of the cohort and/or take other actions when specified changes in social traffic are detected. For example, a social alert may be transmitted to members of the cohort when a statistically significant number of people in the cohort are detected altering the boundaries of the likely geofence (e.g., by moving as a group to a geographic location outside the original boundaries of the geofence). The social alert may promote the social traffic to members of the cohort that have not altered their traffic (e.g., those that remained within the original boundaries of the geofence). In another example, present invention embodiments may cause a message (e.g., a welcome message, an advisory, or an advertisement) to be shown on one or more displays within the geofence when the presence of one or more people that are not members of the given cohort is detected. Other actions that may be taken include, but are not limited to, locking computer screens in the geofence when the presence of one or more people that are not members of the given cohort is detected.

Present invention embodiments may define a cohort based on any attribute or set of attributes shared by a group of people. For example, the following attributes may be used to define a cohort:

Age (e.g., 22 to 62 years old);
Location (e.g., downtown Boston area);
Favorite News Source (e.g., National Public Radio (NPR));
Tobacco Use (e.g., non-smoker); and
Communication Modes Used (e.g., user of electronic devices (computer, smart phone, tablets, etc.) for both work and personal matters).

Present invention embodiments may monitor a given cohort of people within the geofence, e.g., by continuously collecting social traffic information from one or more devices. The types of devices that may be used to collect social traffic information include, but are not limited to, one or more of the following:

security cameras;
RFID interrogators;
badge readers;
GPS transponders;
wireless access points;
user's smartphones (e.g., via application(s) running on the smartphones);
wearable computers; and
other types of sensors.

Present invention embodiments may distinguish between normal and abnormal social traffic conditions and take appropriate steps in response to abnormal social traffic conditions, e.g., to avoid undesirable situations and/or promote desirable behavior. For example, if one or more cameras are used, present invention embodiments may categorize the social traffic condition as normal or abnormal by analyzing dress code information. For example, if the dress code in the geofence is business casual, but present invention embodiments detect people in the geofence dressed more formally (e.g., in suits), the social traffic condition may be categorized as abnormal and appropriate steps may be taken (e.g., triggering a social alert to caution members of the cohort to behave or dress appropriately, etc.).

Present invention embodiments may be configured to determine whether social traffic conditions are normal or abnormal based on thresholds. For example, present invention embodiments may be configured to categorize social traffic conditions as abnormal if more than 10% of the people currently within the geofence are dressed more formally than required by the dress code. In another example, present invention embodiments may be configured to categorize social traffic conditions as abnormal by monitoring the average population in the geofence and triggering a security alert if the population within the geofence exceeds a predetermined threshold (e.g., 10% higher than average) for a given timeframe. The security alert may warn members of the cohort or other people that there could be some important events going on within the vicinity.

When abnormal social traffic conditions are detected, present invention embodiments may check social media, calendars, web content, etc., to determine events that might be occurring within the vicinity and may communicate the information to the cohort or other people via a social alert. Alternatively, or in addition to triggering a social alert, present invention embodiments may build an advertisement when it is determined that a special event is occurring within the geofence. For example, present invention embodiments may obtain and analyze information about the event to determine the core intent of the event (e.g., by searching images associated with the event) and generate a slideshow for the event dynamically.

Present invention embodiments can trigger social alerts in a variety of different ways. For example, triggering social alerts can include broadcasting messages through internal social networking websites, slack, emails, and/or instant messaging broadcasts. Alternatively, or in addition to broadcasting messages, present invention embodiments may cause commands to be sent that override the default lock screen settings for computers in the geofence and promptly lock the computer screens (e.g., as soon as a user walks away from the computer) instead of waiting for the time specified in the default settings.

Present invention embodiments may be configured to detect the social traffic of those that altered the geofence for the cohort and then promote the social traffic to individuals of the cohort that have not altered their traffic/geofence. For example, if user A and user B both work at building C on the same project for the same organization, and user A needs to work in building D the next day (e.g., because a technology conference is being held in building C), user A's social traffic pattern change may cause the shape of the geofence to change. Present invention embodiments may be configured to analyze the reason for such a change. For example, the reason may be correlated with the social feed and identified as a technical conference within the area. Present invention embodiments may then prompt others in the cohort (e.g., by triggering a social alert) that might want to be aware of the event.

It will be appreciated that present invention embodiments may be embedded into and/or coupled with current and future social monitoring, surveillance, and/or messaging systems.

Figure 1:
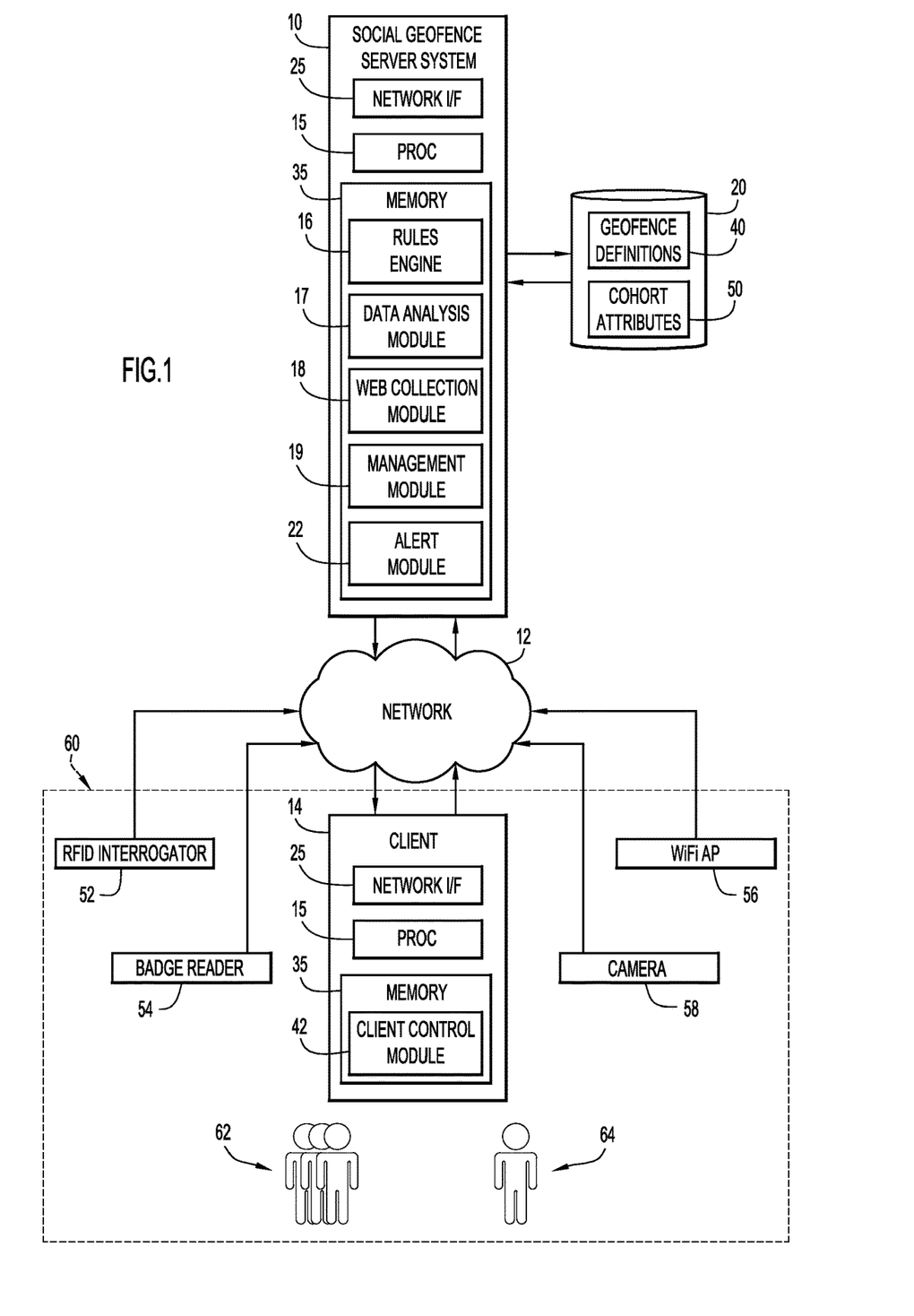
FIG. 1 is a diagrammatic illustration of an example computing environment implementing an embodiment of the present invention and an example change in social traffic in a geographic area that may be determined according to an embodiment of the present invention.

An example environment for use with present invention embodiments is illustrated in FIG. 1. Specifically, the environment includes one or more server systems 10, and one or more client systems 14. Server systems 10 and client systems 14 may be remote from each other and communicate over a network 12. The network 12 may be implemented by any number of any suitable communications media (e.g., wide area network (WAN), local area network (LAN), Internet, Intranet, etc.). Alternatively, server systems 10 and at least some of the client systems 14 may be local to each other, and communicate via any appropriate local communication medium (e.g., local area network (LAN), hardwire, wireless link, Intranet, etc.).

In an example embodiment, one or more server systems 10 may include a management module 19 for defining a likely geofence 60 for a cohort of people 62 and a rules engine 16 configured to execute one or more predefined rules for detecting changes in social traffic relative to the geofenced area based on available data. In example embodiments, the rules may be defined, modified, and/or deleted via the management module 19, and the management module may be accessible by authorized personnel, such as system administrators, supervisors and managers, security professionals, human resources professionals, information technology professionals, etc. Example embodiments may provide access to the management module 19 locally and/or remotely, e.g., via a web browser, client application, or other user interface.

Server systems 10 may also include a web collection module 18 configured to browse online data sources such as corporate websites, social media websites (e.g., Facebook), blogs, etc., for information (e.g., data) that may be relevant to a change in social traffic in a geographic area. For example, web collection module 18 may include a search engine and one or more predefined and/or dynamically created search queries executable by the search engine to obtain data for use by the rules engine 16 or other module. Server systems 10 may further include a data analysis module 17 for analyzing data obtained from one or more sources (e.g., from web collection module 18, social monitoring devices such as one or more radio frequency ID (RFID) interrogators 52, one or more badge readers 54, one or more wireless access points 56, and/or one or more cameras 58, as well as applications running on user's smart phones). An alert module 22 may also be provided to cause a predefined action (e.g., an alert message, a screen lock override command, a targeted advertisement, etc.) to occur when a social alert is triggered. Modules 16, 17, 18, 19, and 22 may be combined into a single module. Alternatively, modules 16, 17, 18, 19, and 22 may be separate as shown, and it will be appreciated that one of more of the modules may each include one or more modules or units to perform the various functions of present invention embodiments described below. The various modules (e.g., modules 16, 17, 18, 19, and 22) may be implemented by any combination of any quantity of software and/or hardware modules or units, and may reside within memory 35 of the server for execution by processor 15.

A database system or data store 20 may store geofence definitions 40, cohort attributes 50, and various other types of information (e.g., alert messages and content). The database system 20 may be implemented by any conventional or other database or storage unit, may be local to or remote from server systems 10, and may communicate via any appropriate communication medium (e.g., local area network (LAN), wide area network (WAN), Internet, hardwire, wireless link, Intranet, etc.).

Client systems 14 located inside the geofence 60 may be configured to receive social alerts from servers 10 by use of a client control module 42 running on client 14. In example embodiments, client control module 42 may be configured to allow the servers 10 to override the lock screen settings of client systems 14, e.g., to immediately cause display screens of the client systems 14 to become locked instead of waiting for a default period of inactivity, in response to a specified change in social traffic in the geofence. Alternatively, or in addition to locking display screens, the client control module 42 may be configured to allow the servers 10 to display predetermined messages and/or content on one or more display screens in the geofence 60. For example, triggering a social alert may cause an alert message to be sent to members of the cohort to warn them of a specified change in social traffic in the vicinity and/or advertisements may be displayed in public areas within the geofence in response to an alert triggered by a specified change in social traffic.

The various modules of client systems 14 (e.g., module 42) may be implemented by any combination of any quantity of software and/or hardware modules or units, and may reside within memory 35 of the client systems 14 for execution by processor 15 of the client systems 14. Alternatively, a client system 14 may be a thin client, and the various modules may reside within memory 35 of the server systems 10 for execution by processor 15 of the server systems when accessed by client system 14.

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available or custom software (e.g., server/communications software, rules engine 16, data analysis module 17, web collection module 18, management module 19, alert module 22, client control module 42, etc.).

FIG. 1 also illustrates an example of a change in social traffic in a geographic area that can be determined according to an embodiment of the present invention. In this example, a geofence 60 is defined based on information (e.g., coordinates) describing the geographic area and/or attributes of a cohort of people 62 expected to be in the geographic area, and a change in social traffic is determined when a person 64 lacking one or more of the attributes of the cohort 62 is detected inside the geofence 60 using one or more social traffic monitoring devices (e.g., RFID interrogator, badge reader, camera, wireless access point, and other types of sensors). In this situation, a social alert may be triggered, causing a warning to be sent to members of the cohort (e.g., via email, instant messaging, broadcast message, etc.), display screens of client systems 14 in the geofence to be locked via an override operation, and/or advertisements targeting the visitor 64 to be displayed on one or more display screens in the geofence.

Figure 2:
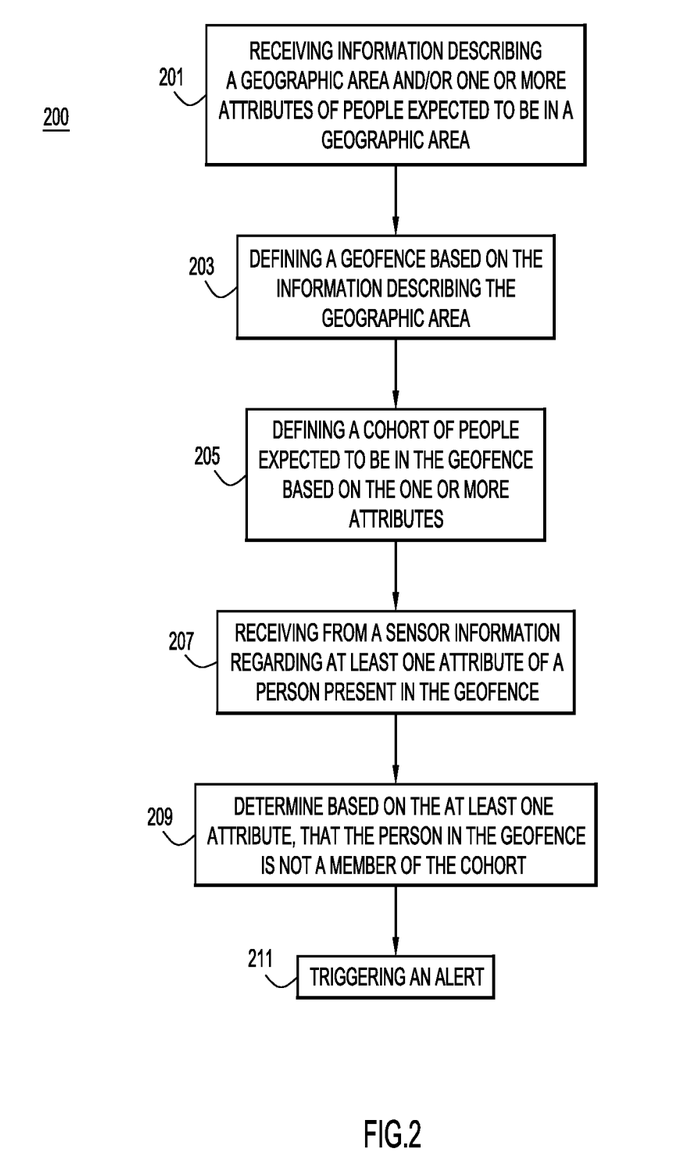
FIG. 2 is a procedural flowchart illustrating a manner of determining changes in social traffic in a geographic area according to an embodiment of the present invention.

A manner of determining a change in social traffic in a geographic area according to the above example embodiment is illustrated in FIG. 2 at 200. Initially, information describing a geographic area and/or one or more attributes of people expected to be in a geographic area is received at step

201 (e.g., via management module 19 and at least one server system 10). For example, the information may include coordinates (e.g., latitude and longitude) associated with a boundary of a geographic area of interest. Attributes of people expected to be in a geographic area may include identity, appearance (e.g., conformance with a specific dress code, facial recognition, etc.), age, employer, organization, job title, employment status (e.g., permanent, temporary, probational, or terminated), group memberships, citizenship, interests, preferences, and/or any other personal characteristics that may be identified by use of social traffic monitoring devices such as cameras, badge readers, RFID interrogators, wireless access points, applications running on smartphones or other computing devices, web collection module, data analysis module in communication with a database, etc. In an example embodiment, the information may be received from a user who enters the information via management module 19 and at least one server system 10. In another example, the information may be received automatically by configuring the server systems 10 to collect such information from one or more social traffic monitoring devices (e.g., via data analysis module 17 and at least one server system 10), from online sources (e.g., via web collection module 18 and at least one server system 10), and/or by accessing information (e.g., organization charts, office maps, etc.) stored in one or more databases such as data base 20.

In step 203, a geofence 60 is defined based on the information describing the geographic area (e.g., via management module 19 and at least one server system 10). For example, the geofence may be defined based on coordinates (e.g., latitude and longitude) describing a boundary of the geographic area. In example embodiments, the geofence 60 may comprise one or more buildings, one or more suites within a building, one or more floors or levels of a building, one or more sections of a floor or level, and/or any other geographic area of interest regardless of shape or size. If only attributes are received in step 201, the server systems 10 may be configured to define a geofence by monitoring the locations of people sharing the received attributes over time (e.g., via social monitoring devices, data analysis module 17, and at least one server system 10). The geofence definition 40 created in step 203 may be stored in database 20.

In step 205, a cohort of people expected to be in the geofence is defined based on the one or more attributes (e.g., via rules engine 16 and at least one server system 10). For example, the attributes received in step 201 may be associated with the geofence to define a cohort of people expected to be in the geofence. If only geographic information is received in step 201, the server systems 10 may be configured to monitor attributes of people in the area over time to determine attributes that may be used to define a cohort (e.g., via social monitoring devices, data analysis module 17, and at least one server system 10). The cohort attributes 50 defined in step 205 may be stored in database 20.

In step 207, sensor information regarding at least one attribute of a person present in the geofence is received from one or more social traffic monitoring devices (e.g., via data analysis module 17 and at least one server system 10). For example, information regarding personal attributes of one or more people in the geofence may be received from social traffic monitoring devices such as cameras, badge readers, RFID interrogators, wireless access points, applications running on smartphones or other computing devices, web collection module, data analysis module in communication with a database, etc. For example, information from wireless access points may be used (e.g., via triangulation) to determine the location of persons within the geofence. In another example, information from one or more cameras arranged to capture images or video in the geofence may be used to receive information about the appearance (e.g., type of attire) of a person present in the geofence. In yet another example, facial recognition, a badge reader and/or RFID interrogator may be used to receive information about the identity of a person in the geofence. In still another example, an application running on a person's smartphone or other personal computing device may report a person's location and information regarding at least one attribute of the person (e.g., via data analysis module 17 and at least one server system 10).

In step 209, a determination is made whether or not the person in the geofence is a member of the cohort defined in step 205, based on the at least one attribute detected in step 207 (e.g., via data analysis module 17 and at least one server 10). For example, a comparison may be made between the attributes obtained in step 207 and cohort attributes 50 stored in database 20. Membership in the cohort may be defined to require a person to share all of the cohort attributes 50 or a certain percentage of the cohort attributes.

If the person in the geofence is determined to not be a member of the cohort, an alert is triggered at step 211 (e.g., via rules engine 16, alert module 22, and at least one server system 10). In this situation, the person may be considered a visitor 64, and the alert may cause a warning to be sent to members of the cohort 62 (e.g., via email, instant messaging, broadcast message, etc.) that a visitor is present in their area. The warning may also include instructions or a reminder on proper behavior when visitors are present. In another example embodiment, display screens of client systems 14 in the geofence may be locked via an override operation. In yet another example embodiment, advertisements targeting the visitor 64 may be displayed on one or more display screens in the geofence. These and other actions may be performed alone or in combination when an alert is triggered.

Figure 3:
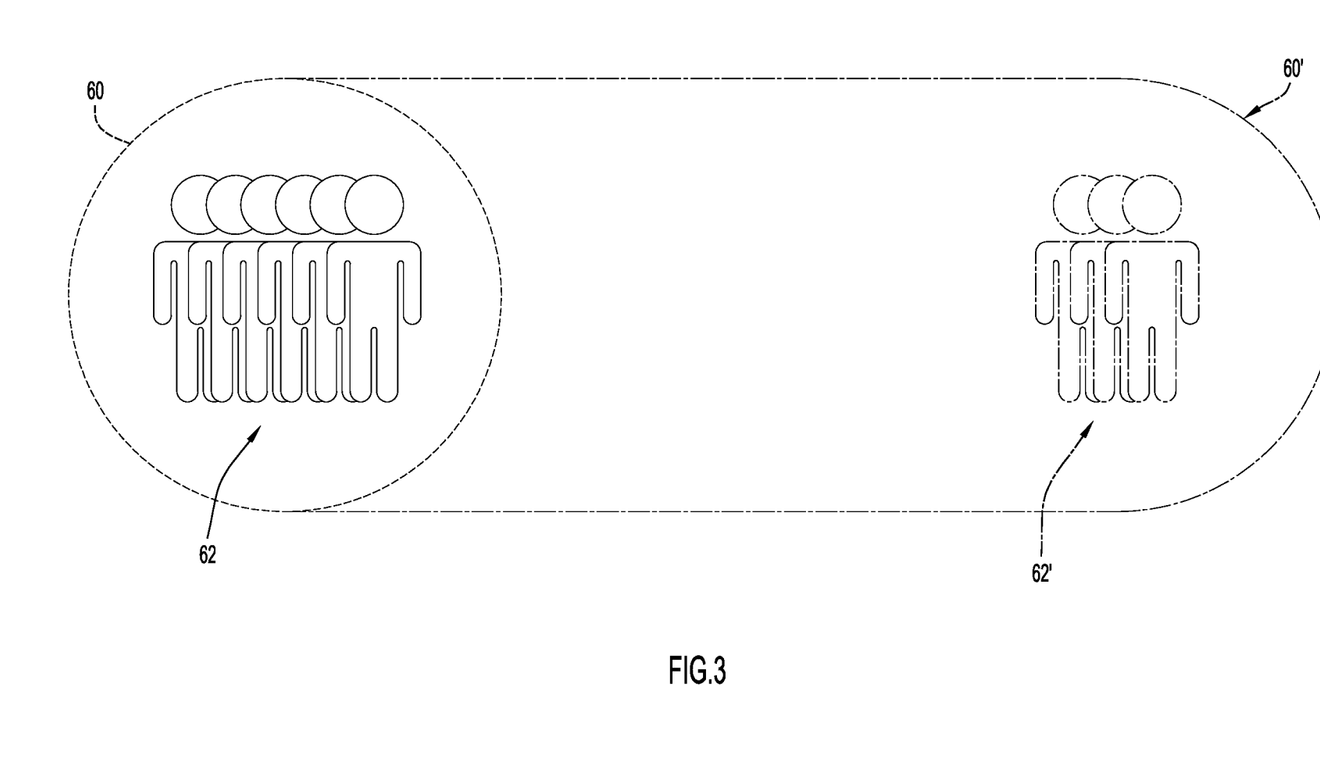
FIG. 3 is a diagrammatic illustration of another example change in social traffic in a geographic area that may be determined according to an embodiment of the present invention.

FIG. 3 illustrates another example of a change in social traffic in a geographic area that can be determined according to an embodiment of the present invention. In this example, an initial geofence 60 is defined based on information (e.g., coordinates) describing a first geographic area and/or attributes of a cohort of people 62 expected to be in the first geographic area, and a change in social traffic is determined when a significant number of cohort members 62' are detected extending the geofence to encompass a second geographic area 60' outside the geofence 60 using one or more social traffic monitoring devices (e.g., RFID interrogator, badge reader, camera, wireless access point, user's smartphones, and other types of sensors). In this situation, information describing the second geographic area 60', the date, and the time may be used to determine a possible event that may be occurring in the second geographic area (e.g., using web collection module 18). If an event is determined at the second geographic location, a social alert may be triggered, causing a message to be sent to members of the cohort remaining in the first geographic area (e.g., via email, instant messaging, broadcast message, etc.). In example embodiments, a message notifying cohort members in the first geographic location of the event occurring in the second geographic location may be sent. The message may also indicate which members of the cohort are already attending the event.

Figure 4:
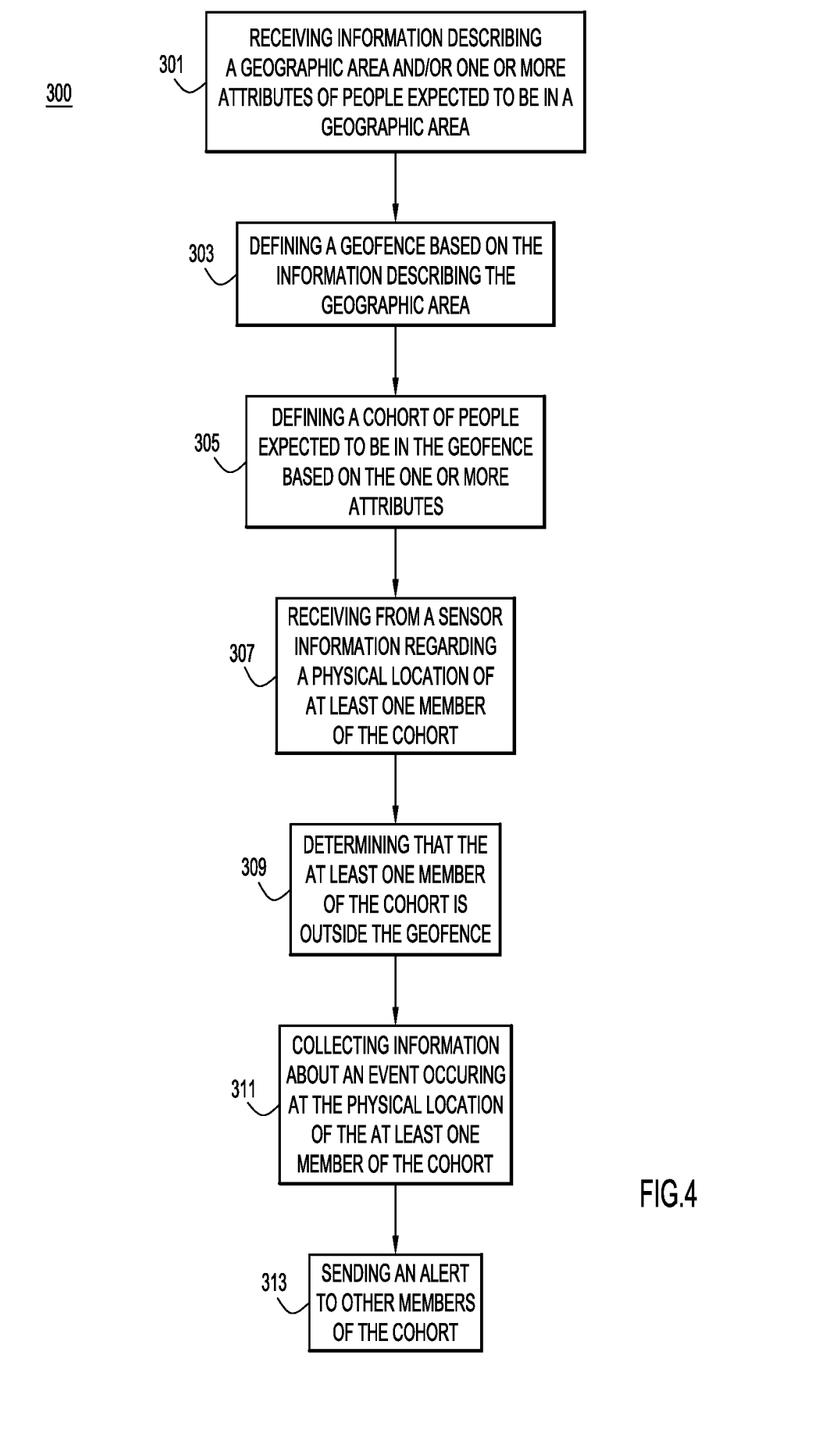
FIG. 4 is a procedural flowchart illustrating a manner of determining changes in social traffic in a geographic area according to another embodiment of the present invention.

A manner of determining a change in social traffic in a geographic area according to the above example embodiment is illustrated in FIG. 4 at 300. Initially, information describing a geographic area and/or one or more attributes of people expected to be in a geographic area is received at step 301 (e.g., via management module 19 and at least one server system 10). For example, the information may include coordinates (e.g., latitude and longitude) associated with a boundary of a geographic area of interest. Attributes of people expected to be in a geographic area may include identity, appearance (e.g., conformance with a specific dress code, facial recognition, etc.), age, employer, organization, job title, employment status (e.g., permanent, temporary, probational, or terminated), group memberships, citizenship, interests, preferences, and/or any other personal characteristics that may be identified by use of social traffic monitoring devices such as cameras, badge readers, RFID interrogators, wireless access points, applications running on smartphones or other computing devices, web collection module, data analysis module in communication with a database, etc. In an example embodiment, the information may be received from a user who enters the information via rules engine 16 and at least one server system 10. In another example, the information may be received automatically by configuring the server systems 10 to collect such information from one or more social monitoring devices (e.g., via data analysis module 17 and at least one server system 10), from online sources (e.g., via web collection module 18 and at least one server system 10), and/or by accessing information (e.g., organization charts, office maps, etc.) stored in one or more databases such as data base 20.

In step 303, a geofence 60 is defined based on the information describing the geographic area (e.g., via rules engine 16 and at least one server system 10). For example, the geofence may be defined based on coordinates (e.g., latitude and longitude) describing a boundary of the geographic area. In example embodiments, the geofence 60 may comprise one or more buildings, one or more suites within a building, one or more floors or levels of a building, one or more sections of a floor or level, and/or any other geographic area of interest regardless of shape or size. If only attributes are received in step 301, the server systems 10 may be configured to define a geofence by monitoring the locations of people sharing the received attributes over time (e.g., via social monitoring devices, data analysis module 17, and at least one server system 10). The geofence definition 40 created in step 303 may be stored in database 20.

In step 305, a cohort of people expected to be in the geofence is defined based on the one or more attributes (e.g., via rules engine 16 and at least one server system 10). For example, the attributes received in step 301 may be associated with the geofence to define a cohort of people expected to be in the geofence. If only geographic information is received in step 301, the server systems 10 may be configured to monitor attributes of people in the area over time to determine attributes that may be used to define a cohort (e.g., via social monitoring devices, data analysis module 17, and at least one server system 10). The cohort attributes 50 defined in step 305 may be stored in database 20.

In step 307, information from a sensor (e.g., a social traffic monitoring device) regarding a physical location of at least one member of the cohort is received (e.g., via data analysis module 17 and at least one server system 10). For example, geographic coordinates (e.g., longitude and latitude) describing the location of each member of the cohort may be received.

In step 309, a determination is made, based on the information received in step 307, that at least one member of the cohort is present at a second geographic location outside the geofence (e.g., via data analysis module 17 and at least one server system 10). For example, the current coordinates of each member of the cohort may be compared with coordinates in the geofence definition 40 and one or more of the member's coordinates may be found to be outside the boundaries of the geofence, as illustrated in FIG. 3. In an example embodiment, the determination that one or more members are outside the geofence may be considered an alteration of the geofence if a significant number of members of the cohort are presently at the same location outside the geofence. For example, a threshold (e.g., a minimum number of members or a minimum percentage of the total number of members) may be set by default or by the user, to indicate that the geofence has been altered.

In step 311, if enough members of the cohort are determined to be outside the geofence at the same location (i.e., a second geographic location), information may be collected about an event occurring at the second geographic location (e.g., via rules engine 16, web collection module 18, and at least one server system 10). For example, information from social media and other web content (e.g., the Facebook page of one of the members outside the geofence, a corporate website, a government website, etc.), a calendar, and/or away messages, etc., may be used to identify an event scheduled to occur at the second geographic area outside the geofence when a significant number of cohort members are present at that location.

An alert may be triggered in step 313 (e.g., via rules engine 16, alert module 22, and at least one server system 10). The alert may cause a message to be sent to other members of the cohort (e.g., via email, instant message, broadcast message, text, etc.). If it is determined that the second geographic location is hosting an event, the message may include information about the event. The message may also identify members of the cohort that are present at the second geographic location. The message may be sent to all members of the cohort or only to members of the cohort that remain in the first geographic location.

It will be appreciated that the example methods shown in FIGS. 2 and 4 may be performed separately or they may be combined. For example, a method according to the present invention may simultaneously monitor persons inside and outside the geofence and take appropriate actions if a person inside the geofence is determined to not be a member of the cohort of people expected to be in the geofence (e.g., as shown in FIG. 1) and/or if a person outside the geofence is determined to be a member of the cohort of people expected to be in the geofence (e.g., as shown in FIG. 3).

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, rules engine 16, data analysis module 17, web collection module 18, management module 19, alert module 22, client control module 42, etc.). These systems may include any types of monitors and input devices (e.g., keyboard, mouse, voice recognition, etc.) to enter and/or view information.

It is to be understood that the software (e.g., rules engine 16, data analysis module 17, web collection module 18, management module 19, alert module 22, client control module 42, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., rules engine 16, data analysis module 17, web collection module 18, management module 19, alert module 22, client control module 42, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., geofence definitions, cohort attributes, rules, etc.). The database system may be implemented by any number of any conventional or other databases, data stores or storage structures (e.g., files, databases, data structures, data or other repositories, etc.) to store information (e.g., geofence definitions, cohort attributes, rules, etc.). The database system may be included within or coupled to the server and/or client systems. The database systems and/or storage structures may be remote from or local to the computer or other processing systems, and may store any desired data (e.g., geofence definitions, cohort attributes, rules, etc.).

The present invention embodiments may employ any number of any type of user interface (e.g., Graphical User Interface (GUI), command-line, prompt, etc.) for obtaining or providing information (e.g., information describing a geographic area and/or attributes of a cohort), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to identifying the specific changes in social traffic in a geographic area described above, but may be utilized to identify other changes in social traffic in the geographic area. Similarly, the present invention embodiments are not limited to performing the actions described above, but may perform different actions in response to changes in social traffic in the geographic area.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for responding to changes in social traffic in a geographic area comprising:

receiving, via an electronic communications interface, information describing a geographic area and one or more attributes of people expected to be in the geographic area;
defining a geofence based on the information describing the geographic area;
defining a cohort of people expected to be in the geofence based on the one or more attributes of people expected to be in the geographic area;
receiving, via an electronic communications interface, information from a sensor regarding at least one attribute of people at a geographic location outside the geofence;
determining, based on the at least one attribute, whether or not the people are members of the cohort of people expected to be in the geofence; and
triggering an alert in response to determining that a number of members of the cohort at the geographic location outside the geofence is greater than a number of members of the cohort inside the geofence, wherein triggering an alert further comprises:
   determining an event occurring at the geographic location of the people who are outside the geofence by accessing a calendar of one or more members of the cohort at the geographic location outside the geofence and identifying the event from an entry in the calendar at a corresponding time; and
   sending the alert to the members of the cohort inside the geofence indicating the event and identifying the members of the cohort at the geographic location outside the geofence attending the event.

2. The method of claim 1, wherein triggering an alert includes sending, via an electronic communications interface, a message to members of the cohort of people in the geofence.

3. The method of claim 1, wherein triggering an alert includes causing a message to be displayed to a person in the geofence.

4. The method of claim 3, wherein the message is displayed on one or more display screens in the geofence.

5. The method of claim 1, further comprising:
receiving information from a sensor regarding at least one attribute of a person inside the geofence,
determining, based on the at least one attribute, whether or not the person is a member of the cohort of people expected to be in the geofence, and
triggering an alert in response to determining that the person inside the geofence is not a member of the cohort of people expected to be in the geofence.

6. The method of claim 1, further comprising collecting, via an electronic communications interface, information about the event occurring at the geographic location of the people who are outside the geofence.

7. The method of claim 1, wherein the geofence is associated with an appearance requirement for members of the cohort, and the method further comprises:
receiving, via an electronic communications interface, information from a sensor regarding at least one attribute of people inside the geofence, wherein the at least one attribute includes an appearance of the people inside the geofence;
triggering an alert in response to determining that a number of members of the cohort inside the geofence have an appearance varying from the appearance requirement; and
sending the alert to members of the cohort indicating the variance to the appearance requirement.

8. The method of claim 6, wherein collecting information about the event includes collecting information from at least one of a group consisting of social media, the calendar, and an away message.

9. The method of claim 1, wherein the sensor comprises an RFID interrogator, a WiFi access point, a badge reader, or a camera.

10. A system for responding to changes in social traffic in a geographic area, comprising:
at least one processor configured to:
   receive, via an electronic communications interface, information describing a geographic area and one or more attributes of people expected to be in the geographic area;
   define a geofence based on the information describing the geographic area;
   define a cohort of people expected to be in the geofence based on the one or more attributes;
   receive, via an electronic communications interface, information from a sensor regarding at least one attribute of people at a geographic location outside the geofence;
   determine, based on the at least one attribute, whether or not the people are members of the cohort of people expected to be in the geofence; and
   trigger an alert in response to a determination that a number of members of the cohort at the geographic location outside the geofence is greater than a number of members of the cohort inside the geofence, wherein triggering an alert further comprises:
      determining an event occurring at the geographic location of the people who are outside the geofence by accessing a calendar of one or more members of the cohort at the geographic location outside the geofence and identifying the event from an entry in the calendar at a corresponding time; and
      sending the alert to the members of the cohort inside the geofence indicating the event and identifying the members of the cohort at the geographic location outside the geofence attending the event.

11. The system of claim 10, wherein the at least one processor is configured to trigger an alert by sending, via an electronic communications interface, a message to members of the cohort of people in the geofence.

12. The system of claim 10, wherein the at least one processor is configured to trigger an alert by causing a message to be displayed to a person in the geofence.

13. The system of claim 12, wherein the at least one processor is configured to display the message on one or more display screens in the geofence.

14. The system of claim 10, wherein the at least one processor is further configured to:
receive, from the sensor, information regarding at least one attribute of a person inside the geofence,
determine, based on the at least one attribute, whether or not the person is a member of the cohort of people expected to be in the geofence, and
trigger an alert in response to a determination that the person inside the geofence is not a member of the cohort of people expected to be in the geofence.

15. The system of claim 10, wherein the at least one processor is configured to collect, via an electronic communications interface, information about the event occurring at the geographic location of the people who are outside the geofence.

16. The system of claim 10, wherein the geofence is associated with an appearance requirement for members of the cohort, and the at least one processor is further configured to:
  receive, via an electronic communications interface, information from a sensor regarding at least one attribute of people inside the geofence, wherein the at least one attribute includes an appearance of the people inside the geofence;
  trigger an alert in response to determining that a number of members of the cohort inside the geofence have an appearance varying from the appearance requirement; and
  send the alert to members of the cohort indicating the variance to the appearance requirement.

17. The system of claim 15, wherein the at least one processor is configured to collect information about the event from at least one of a group consisting of social media, the calendar, and an away message.

18. A computer program product for responding to changes in social traffic within a geographic area, the computer program product comprising one or more non-transitory computer readable storage media collectively having program instructions embodied therewith, the program instructions executable by a computer processor to cause the computer processor to:
  receive, via an electronic communications interface, information describing a geographic area and one or more attributes of people expected to be in the geographic area;
  define a geofence based on the information describing the geographic area;
  define a cohort of people expected to be in the geofence based on the one or more attributes;
  receive, via an electronic communications interface, information from a sensor regarding at least one attribute of people at a geographic location outside the geofence;
  determine, based on the at least one attribute, whether or not the people are members of the cohort of people expected to be in the geofence; and
  trigger an alert in response to a determination that a number of members of the cohort at the geographic location outside the geofence is greater than a number of members of the cohort inside the geofence, wherein triggering an alert further comprises:
    determining an event occurring at the geographic location of the people who are outside the geofence by accessing a calendar of one or more members of the cohort at the geographic location outside the geofence and identifying the event from an entry in the calendar at a corresponding time; and
    sending the alert to the members of the cohort inside the geofence indicating the event and identifying the members of the cohort at the geographic location outside the geofence attending the event.

19. The computer program product of claim 18, wherein the program instructions are executable by a computer processor to cause the computer processor to trigger an alert by sending, via an electronic communications interface, a message to members of the cohort of people in the geofence.

20. The computer program product of claim 18, wherein the program instructions are executable by a computer processor to cause the computer processor to trigger an alert by causing a message to be displayed to a person in the geofence.

21. The computer program product of claim 20, wherein the program instructions are executable by a computer processor to cause the computer processor to display the message on one or more display screens in the geofence.

22. The computer program product of claim 18, wherein the program instructions are executable by a computer processor to further cause the computer processor to:
  receive, from the sensor, information regarding at least one attribute of a person inside the geofence,
  determine, based on the at least one attribute, whether or not the person is a member of the cohort of people expected to be in the geofence, and
  trigger an alert in response to a determination that the person inside the geofence is not a member of the cohort of people expected to be in the geofence.

23. The computer program product of claim 18, wherein the program instructions are executable by a computer processor to cause the computer processor to collect, via an electronic communications interface, information about the event occurring at the geographic location of the people who are outside the geofence.

24. The computer program product of claim 18, wherein the geofence is associated with an appearance requirement for members of the cohort, and the program instructions are executable by a computer processor to cause the computer processor to:
  receive, via an electronic communications interface, information from a sensor regarding at least one attribute of people inside the geofence, wherein the at least one attribute includes an appearance of the people inside the geofence;
  trigger an alert in response to determining that a number of members of the cohort inside the geofence have an appearance varying from the appearance requirement; and
  send the alert to members of the cohort indicating the variance to the appearance requirement.

25. The computer program product of claim 23, wherein the program instructions are executable by a computer processor to cause the computer processor to collect information about the event from at least one of a group consisting of social media, the calendar, and an away message.

* * * * *